(12) United States Patent
Taubin et al.

(10) Patent No.: US 8,054,875 B2
(45) Date of Patent: Nov. 8, 2011

(54) AUTOREGRESSIVE MOVING AVERAGE MODELING FOR FEEDFORWARD AND FEEDBACK TOMLINSON-HARASHIMA PRECODER FILTERS

(75) Inventors: Felix Aleksandrovich Taubin, St. Petersburg (RU); Sergev Valentinovich Bulatnov, Leningradskaya OBL (RU)

(73) Assignee: Intel Corporation, Santa Clara, CA (US)

( * ) Notice: Subject to any disclaimer, the term of this patent is extended or adjusted under 35 U.S.C. 154(b) by 465 days.

(21) Appl. No.: 12/087,178

(22) PCT Filed: Dec. 29, 2005

(86) PCT No.: PCT/RU2005/000683
§ 371 (c)(1),
(2), (4) Date: Nov. 21, 2008

(87) PCT Pub. No.: WO2007/075107
PCT Pub. Date: Jul. 5, 2007

(65) Prior Publication Data
US 2009/0219984 A1 Sep. 3, 2009

(51) Int. Cl.
*H04L 25/49* (2006.01)
(52) U.S. Cl. .................. 375/232; 375/296; 375/350
(58) Field of Classification Search .............. 375/232, 375/346, 350, 296
See application file for complete search history.

(56) References Cited

U.S. PATENT DOCUMENTS 5,852,630 A * 12/1998 Langberg et al. .............. 375/219
5,878,086 A * 3/1999 Hulyalkar ..................... 375/285

OTHER PUBLICATIONS

Principe, J.C. et al., "Generalized feedforward structures: a new class of adaptive filters." Mar. 1992, Acoustics, Speech and Signal Processing, 1992., pp. 245-248.*
"IOGBASE-T PAM Scheme : Proposed Overall Architecture", *IEEE P802.3AN Task Force*, (Jul. 12, 2004),1-27.
Al-Dhahir, N , "Stable pole-zero modeling of long FIR filters with application to the MMSE-DFE", *IEEE Transactions on Communications*, 45(5), (May 1997),508-513.
Anna, S. , et al., "Filerbank Transceivers Optimizing Information Rate in Block Transmissions over Dispersive Channels", *IEEE Transactions on Information Theory*,45(3), (Apr. 1999),1019-1032.
Burrus, C , "Time domain design of recursive digital filters", *IEEE Transactions on Audio and Electroacoustics*, 18(2), (Jun. 1970),137-141.
Evans, A , "Optimal least squares time-domain synthesis of recursive digital filters", *IEEE Transactions on Audio and Electroacoustics*, 21(1), (Feb. 1973),61-65.
Jia, L. , "Transmitter-Based Multiple Access Interference Rejection and Diversity Techniques for Code-Division Multiple Access Systems", (Aug. 1, 2005),1-108.
Proakis, John G., "Digital communications", *New York : McGraw-Hill*, 3rd ed.,(1995),583-635.

(Continued)

*Primary Examiner* — Shuwang Liu
*Assistant Examiner* — David Huang
(74) *Attorney, Agent, or Firm* — Schwegman, Lundberg & Woessner, P.A.

(57) ABSTRACT

Apparatus and methods provide a Tomlinson-Harashima precoder scheme in which a feedback filter may be constructed to match an approximated feedforward filter, where the feedforward filter is approximated using autoregressive moving average modeling.

20 Claims, 5 Drawing Sheets

OTHER PUBLICATIONS

Shaw, A , "An optimal method for identification of pole-zero transfer functions", *IEEE International Symposium on Circuits and Systems, ISCAS '92. Proceedings*, vol. 5, (May 3-6, 1992),2409-2412.

Simeone, O. , et al., "Linear and Nonlinear Preequalization/Equalization for MIMO Systems With Long-Term Channel State Information at the Transmitter", *IEEE Transactions of Wireless Communications*,3(2), (Mar. 2004),373-378.

Ungerboeck, Gottfried , "10GBASE-T Cable characteristics, front-end solutions, and precoders", *IEEE P802.3an Task Force Meeting*, (Mar. 2005),1-39.

Ungerboeck, Gottfried , "10GBASE-T PAM Scheme: Fixed Precoder for all Cable Types and Lengths", *IEEE P802.3an Task Force Meeting*, (Jul. 2004),1-27.

* cited by examiner

AUTOREGRESSIVE MOVING AVERAGE MODELING FOR FEEDFORWARD AND FEEDBACK TOMLINSON-HARASHIMA PRECODER FILTERS

RELATED APPLICATION

This application is a U.S. National Stage Filing under 35 U.S.C. 371 from International Patent Application Serial No. PCT/RU2005/000683, filed Dec. 29, 2005, and published on Jul. 5, 2007 as WO 2007/075107 A1, which is incorporated herein by reference in its entirety.

TECHNICAL FIELD

Embodiments of the invention relate generally to precoders for communication channels.

BACKGROUND

Channels in a communication network may typically experience channel distortion: This channel distortion may result in intersymbol interference (ISI), which essentially is the spreading of a signal pulse outside its allocated time interval, causing interference with adjacent pulses. If a communication channel is uncompensated with respect to its intersymbol interference, high error rates may result. Various methods and designs are used for compensating or reducing intersymbol interference in a signal received from a communication channel. The compensators for such intersymbol interference are known as equalizers. Various equalization methods include use of maximum-likelihood (ML) sequence detection, linear filters with adjustable coefficients, decision-feedback equalization (DFE), and Tomlinson-Harashima precoders for ISI cancellation. To provide higher-speed reliable data communication, what is needed are enhanced schemes for providing channel equalization, which at the same time can be implemented without a significant amount of complexity.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the present invention. Other embodiments may be utilized and structural, logical, and electrical changes may be made without departing from the scope of the invention. The various embodiments disclosed herein are not necessarily mutually exclusive, as some disclosed embodiments can be combined with one or more other disclosed embodiments to form new embodiments. The following detailed description is, therefore, not to be taken in a limiting sense.

Figure 1:
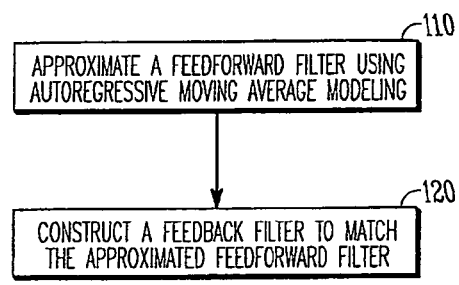
FIG. 1 illustrates a flow diagram of features of an embodiment of a method to provide a Tomlinson-Harashima precoder scheme having a feedback filter matched to a feedforward filter with the feedforward filter approximated using autoregressive moving average modeling.

FIG. 1 illustrates a flow diagram of features of an embodiment of a method to provide a Tomlinson-Harashima precoder scheme having a feedback filter matched to a feedforward filter with the feedforward filter approximated using autoregressive moving average modeling. At 110, a feedforward filter may be approximated using autoregressive moving average modeling. Autoregressive moving average (ARMA) modeling is a mathematical modeling of a time series based on the assumption that each value of the series depends only on a weighted sum of the previous values of the same series (autoregressive component) and on a weighted sum of the present and previous values of a different time series (moving average component) with the addition of a noise factor. For example, if y(k) is the k-th value of a time series to model, u(k) is a different time series, and n(k) is noise, then an ARMA model (b,a) of order (N,M) may be represented by:

$$y_k = \sum_{i=1}^{N} a_i y_{k-i} + \sum_{i=0}^{M} b_i u_{k-i} + n_k$$

In an embodiment, an approximated feedforward filter may be realized in a Tomlinson-Harashima precoder scheme. In such a scheme, a feedforward filter is located at a receiver end of a communication channel and a feedback filter is located at a transmit end of a communication channel. Various approaches to determining coefficients for a filter such as a feedforward filter include using the well-known Levinson-Durbin algorithm. In an embodiment, the Steiglitz-McBride method may be applied to finding infinite impulse response (IIR) filter coefficients to build an IIR filter with the number of poles not equal to the number of zeros, as opposed to the Levinson-Durbin algorithm.

The Steiglitz-McBride method is a fast iterative algorithm that solves for the numerator and denominator coefficients of a rational transfer function simultaneously in an attempt to minimize the signal error between an output of a emit and the time-domain impulse response of the unit. In an embodiment, the Steiglitz-McBride algorithm may be used to approximate a given time-domain response by an appropriate ARMA model or digital rational transfer function. An ARMA model may be used to generate a digital rational transfer function for a feedforward filter that is used for an approximation of a given time-domain impulse response of the feedforward filter. The impulse response of the ARMA model may be expressed as b(z)/a(z). The Steiglitz-McBride algorithm may be applied to solve for the numerator b(z) and the denominator a(z) such that the squared error is minimized between the impulse response of b(z)/a(z) and the given time-time domain impulse response. Two variants of the time-domain impulse response may be used as the given time-domain impulse response. First, the impulse response of the feedforward filter may be used and thereafter the impulse response of a target feedback filter may be used. The target feedback filter may be correlated to the approximated feedforward filter. This algorithm usually converges rapidly, but might not converge if the model order is too large.

At 120, a feedback filter to match the approximated feedforward filter may be constricted. A target feedback filter defined by the polynomial B(z) may be constructed to match the result of the feedforward filter approximation by generating the relationship B(z)=1−R(z)*H(z), where the operator * is the convolution operator. The polynomial R(z) provides an ARMA approximation of a feedforward filter for a channel having impulse response H(z). Then, the target feedback filter defined by the polynomial B(z), where B(z)=1−R(z)*H(z), comprises, in a general way, an DIR filter. B(z) is a digital rational transfer function with its own numerator and denominator. The denominator of B(z) may be identical with the denominator of R(z), where the denominator has a small size degree. In an embodiment, a denominator for B(z) has a degree of 3. The numerator of B(z) may have a large degree, typically of the order of 100 or more. In an embodiment, a target feedback filter, which is defined by the polynomial B(z), may be ARMA approximated to generate an IIR filter solution having fewer filter taps. H(z) may be known at the transmit end and at the receive end. In an embodiment, a feedback filter may be constructed by generating a target feedback filter from an approximation of a feedforward filter and by conducting autoregressive moving average modeling of the target feedback filter to form the feedback filter.

In various embodiments, ARMA modeling for feedforward and feedback Tomlinson-Harashima precoder filters provides for feedforward and feedback filters that have relatively small size. Feedback and feedforward filters in a classical Tomlinson-Harashima precoder (THP) are typically chosen to minimize mean square error (MSE) at the precoder output given some channel impulse response, which may result in THP having a large feedback filter for Ethernet 10 gigabit (10 G) cables having lengths ranging from about 100 meters to about 150 meters.

In an embodiment, a feedback filter in a Tomlinson-Harashima precoder scheme may be constructed to match a provided feedforward filter, where the feedforward filter is constructed using autoregressive moving average modeling. A set of feedforward filters may be approximated using autoregressive moving average modeling corresponding to communication channels of varying characteristics, such as different channel lengths. The characteristics that define a feedforward filter in the set of feedforward filters may be provided to construct a feedback filter. In an embodiment, a training mode process may be performed for a communication arrangement using a Tomlinson-Harashima precoder scheme such that once a feedforward filter is approximated using autoregressive moving average modeling at a receive end of a communication channel, the characteristics of the feedforward filter may be provided to the transmit end of the communication channel to construct a matching feedback filter.

Figure 2:
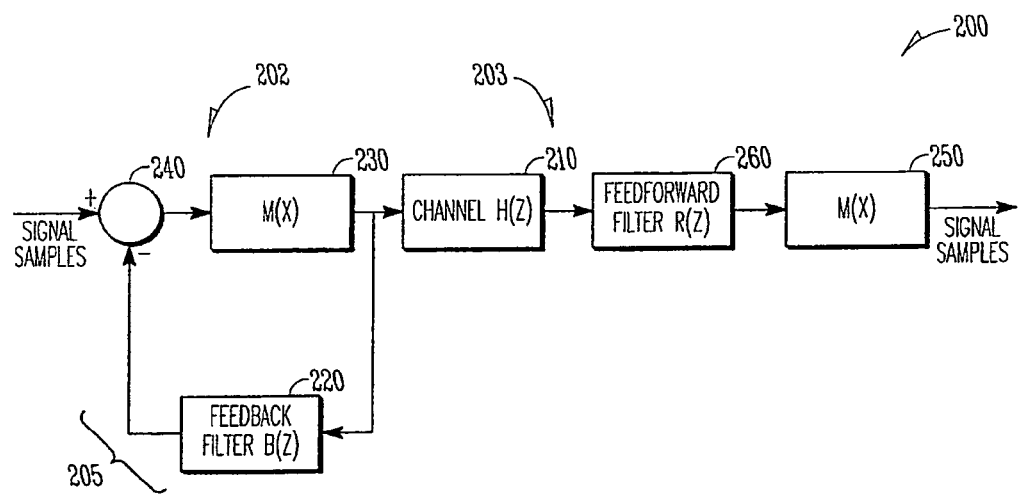
FIG. 2 depicts a network that includes an embodiment of a precoder configured according to a Tomlinson-Harashima precoder scheme having a feedback filter matched to a feedforward filter with the feedforward filter approximated using autoregressive moving average modeling.

FIG. 2 illustrates a network 200 that includes an embodiment of a precoder 205 configured according to a Tomlinson-Harashima precoder scheme having a feedback filter 220 matched to a feedforward filter 260 with feedforward filter 260 approximated using autoregressive moving average modeling. Feedforward filter 260 may be defined by polynomial R(z), where R(z) may be determined using autoregressive moving average modeling. Feedback filter 220 may be defined by target polynomial B(z) that may be matched to R(z). In an embodiment, target polynomial B(z) may be related to an ARMA approximation filter R(z) by B(z)=1−R(z)*H(z). In an embodiment, a feedback filter and a feedforward filter may be ARMA approximated. A Tomlinson-Harashima precoding scheme provides for implementation of a feedback filter at the transmitter end of the communication channel with a mechanism to limit output signal amplitude. Signal samples transmitted in channel 210 between node 202 and node 203 are subjected to a feedback filter 220 and a modulo reduction function M(x) 230 to avoid overflowing the signal bounds. Modulo reduction function 230 is a modulo operation to limit the amplitude of the signals to be transmitted into channel 210. The feedback loop is closed with feedback filter 220 coupled back to a summer 240 that receives the signal samples. At the receive end of the communication channel, a feedforward filter 260 receives the transmitted symbols and provides a filtered signal to a receive modulo reduction function 250 that maps the signal to symbol estimates in an operation effectively inverse to map-reduction function 230. For a given THP scheme, two filter units are associated with the precoder, feedback filter 220 at a transmit end of a channel and a feedforward filter 260 at a reception end of a channel. In an embodiment, network 200 may be a 10 Gigabit Ethernet network in which equalization is provided using an embodiment of a THP scheme.

A Tomlinson-Harashima precoder is to be the part of an Institute of Electrical and Electronics Engineers (IEEE) standard, IEEE 802.3an standard. In a draft, Draft P802.3an/D2.1, of IEEE standard Ethernet 802.3an for 10GBASE-T having a formal expiration date of 21 Jul. 2005, use of a fixed set of Tomlinson-Harashima precoders for channel equalization during transmission over cables of different lengths was indicated. The number of precoders in the precoder set is not defined, but the range is approximately from 4 to 8 fixed precoders. In contrast to measuring the channel impulse response and optionally tuning precoder filters for this response before transmission, there will be a set of THP filters coefficients for all transmission conditions. This means that, during initialization, network cards for 10GBASE-T may estimate the channel, but the precoders may not be constructed using the channel estimate. The precoders will be selected as one of the predefined set of the precoders. For a traditional THP, feedforward and feedback precoder filters are chosen to minimize MSE at the precoder output given some channel impulse response H(z), where M(x) denotes the modulo operator, which for the case of pulse amplitude modulation with M possible symbol values (M-PAM) with minimum signal distance d is given by $$M(x) = x - Md \left\lfloor \frac{x + \frac{Md}{2}}{Md} \right\rfloor$$

A typical length for Ethernet 10G cables of acceptable ISI values is from about 100 m to about 150 m, but the length depends on cable type. For such a case, the THP feedback filter generally has a large size, where the filter size is defined by the number of filter taps. As the number of filter taps increases, the complexity for the implementation of the usual Tomlinson-Harashima precoder in 10G framework increases.

In an embodiment, a Tomlinson-Harashima precoding scheme includes a feedforward filter having ARMA approximated filter taps with a feedback filter constructed based on the feedforward filter and the channel impulse response. The feedforward filter may have a small size. In an embodiment, a feedforward filter has 20 or fewer ARMA approximated filter taps. In an embodiment, a feedback filter matched to a small size feedforward may have a small size. In an embodiment, a feedback filter may be ARMA approximated based on an ARMA approximated feedforward filter. In an embodiment, a feedback filter has 10 or fewer filter taps. In an embodiment, feedforward filter 260 and feedback filter 220 may be infinite impulse response filters. In an embodiment, both feedback filter 220 and feedforward filter 260 may be specified as finite impulse response (FIR) filters. In an embodiment, one of feedback filter 220 and feedforward filter 260 may be an IIR filter with the other filter being a FIR filter. IIR filters typically meet a given set of specifications with a much lower filter order than does a corresponding FIR filter. In an embodiment, parametric modeling may be used to find a digital filter that approximates a prescribed time domain response.

Figure 3:
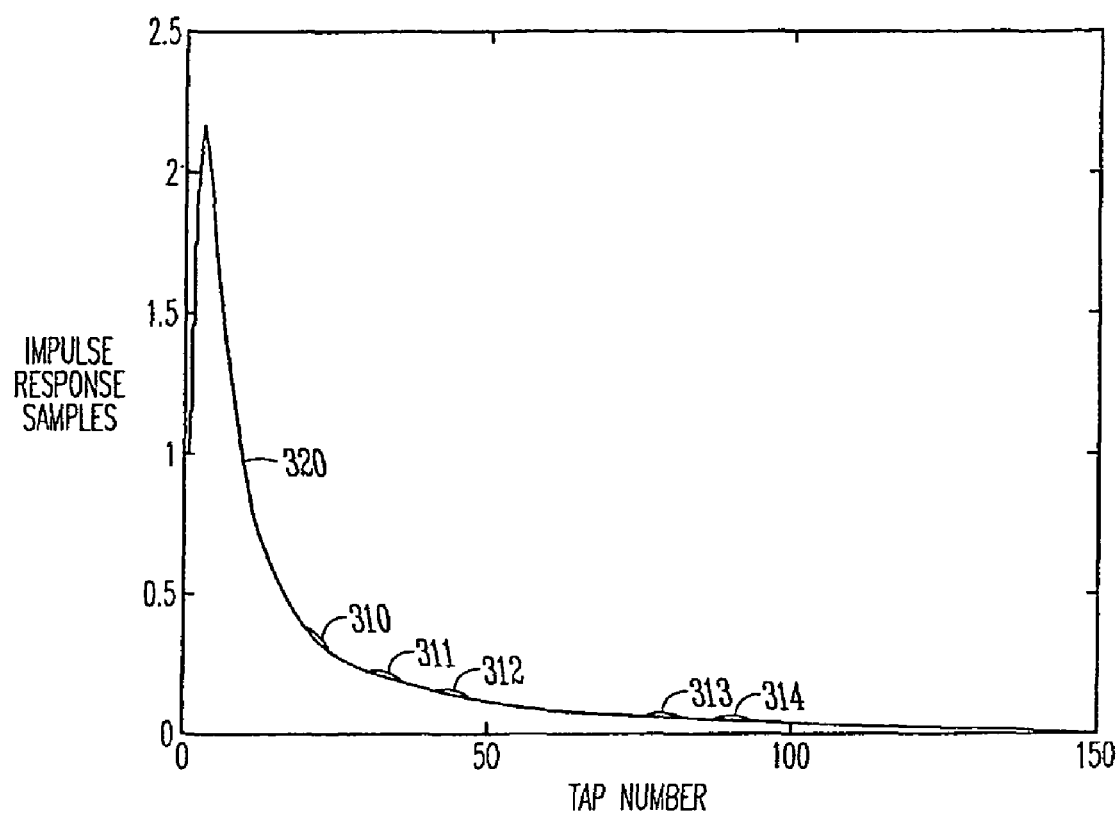
FIG. 3 shows a simulation of an embodiment of a feedback filter in a Tomlinson-Harashima precoder scheme using autoregressive moving average modeling as compared to a feedback filter of a standard Tomlinson-Harashima precoder.

FIG. 3 shows a simulation of an embodiment of a feedback filter in a Tomlinson-Harashima precoder scheme using autoregressive moving average modeling as compared to a feedback filter of a standard Tomlinson-Harashima precoder. The standard Tomlinson-Harashima precoder has a FIR feedback filter and the ARMA implemented feedback filter is an ARMA(6, 5) IIR filter. Data points 310-314 are for the FIR filter and curve 320 for the ARMA(6, 5) IIR filter. Curve 320 and data points 310-314 demonstrate that the impulse response for the IIR fitter is approximately the same as for the FIR filter.

Figure 4:
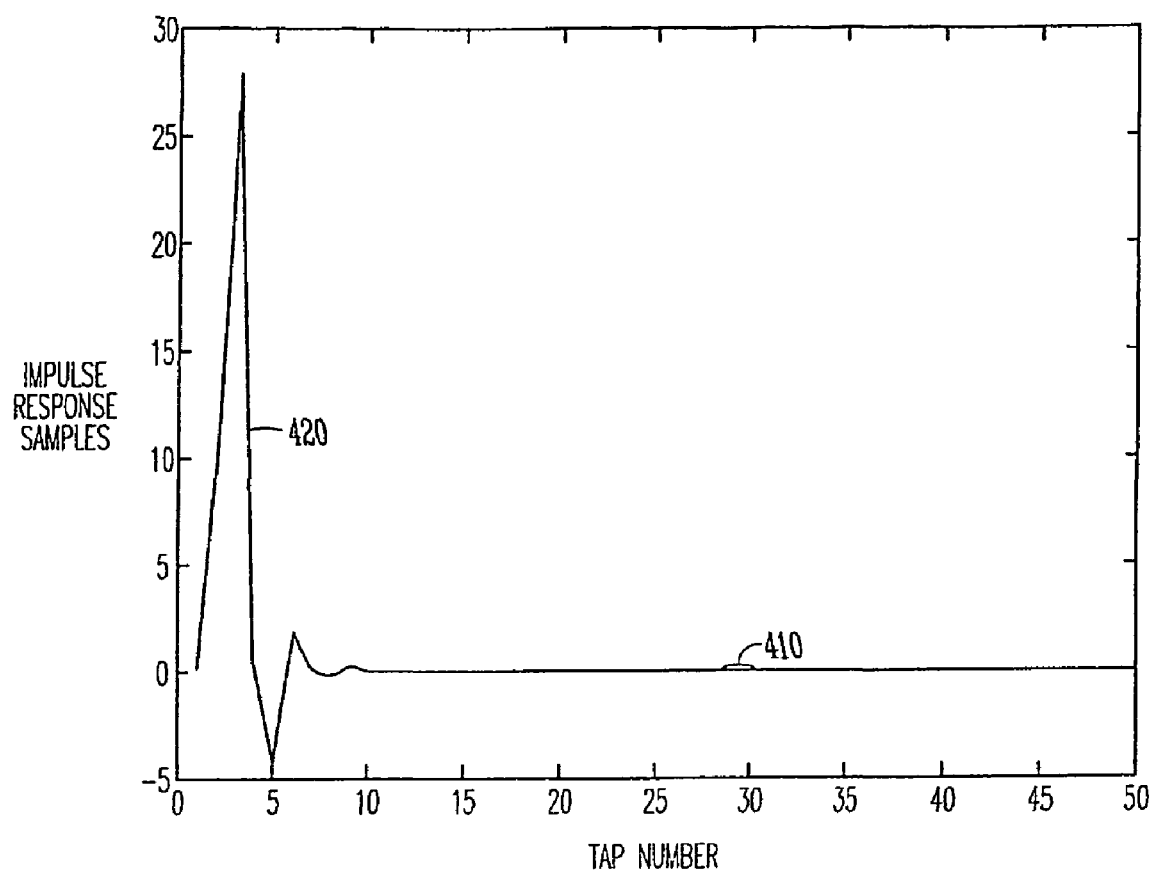
FIG. 4 shows a simulation of an embodiment of a feedforward filter in a Tomlinson-Harashima precoder scheme using autoregressive moving average modeling as compared to a feedforward filter of a standard Tomlinson-Harashima precoder.

FIG. 4 shows a simulation of an embodiment of a feedforward filter in a Tomlinson-Harashima precoder scheme using autoregressive moving average modeling as compared to a feedforward filter of a standard Tomlinson-Harashima precoder. The standard Tomlinson-Harashima precoder has a feedforward FIR filter and the ARMA implemented feedforward filter is an ARMA(3, 3) IIR filter. Data point 410 is for the FIR filter and curve 420 for the ARMA(3, 3) IIR filter. Curve 420 and data point 410 demonstrate that application of an ARMA(3,3) IIR approximation for the target feedforward filter provides a result approximately the same as for the FIR filter.

Figure 5:
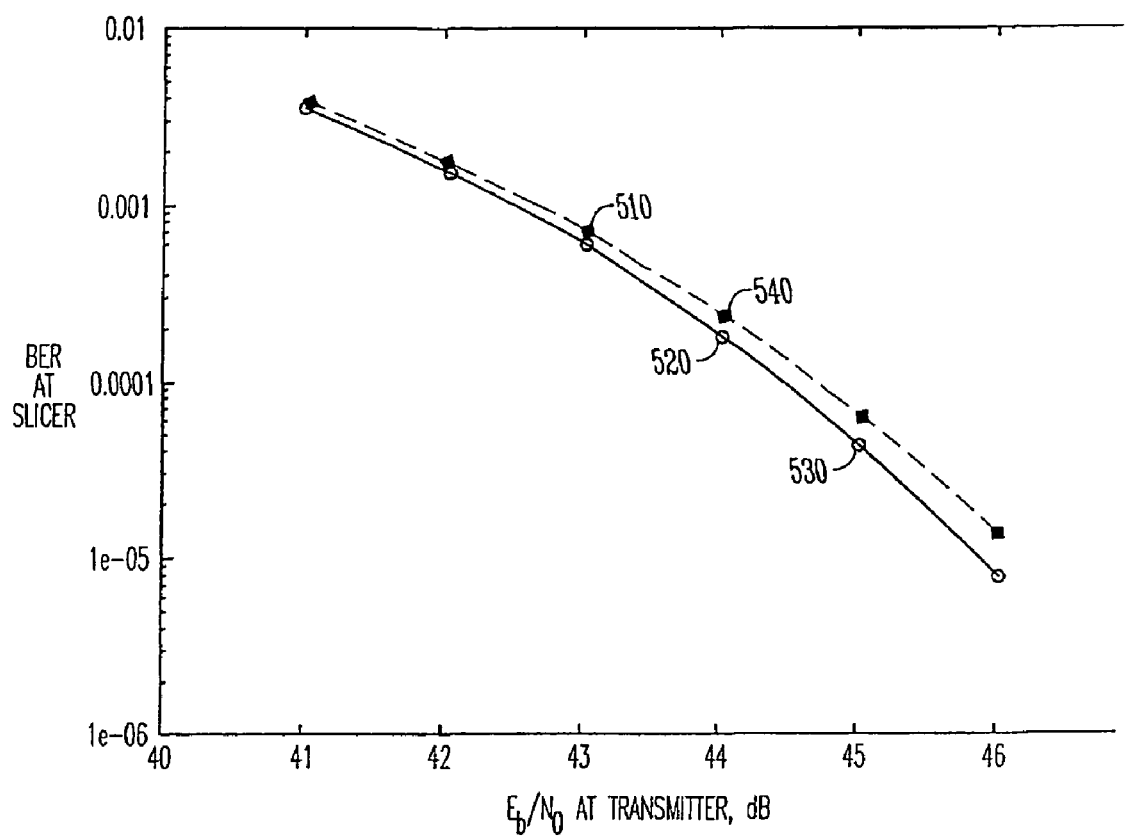
FIG. 5 shows a simulation of an embodiment of a Tomlinson-Harashima precoder scheme using autoregressive moving average modeling with respect to a bit error rate for a 100 m category 7 cable.

FIG. 5 shows a simulation of an embodiment of a Tomlinson-Harashima precoder scheme using autoregressive moving average modeling with respect to a bit error rate (BER) for a 100 m category 7 cable. The performance of resulting precoding scheme using IIR filters for different number of poles and zeros in ARMA approximations is shown at FIG. 5. Curve 540 having essentially the same performance as curve 510 has a feedforward IIR filter with a ARMA 3-pole, 3-zero model plus a ARMA 6-pole, 5-zero model for the feedback filter. The lower BER is obtained with curves 520 and 530 having essentially the same performance. Curve 520 is for a feedback filter approximated with an ARMA 6-pole, 5-zero model. Curve 530 is for a feedforward filter approximated with an ARMA 3-pole, 3-zero model.

In an embodiment, the number of filter taps may be reduced from 150 for a classical THP feedback filter to 12 for a THP ARMA approximated feedback filter. In an embodiment, the number of filter taps may be reduced from 30 for a classical THP feedforward filter to 7 for a THP ARMA approximated feedforward filter. In an embodiment, the performance loss of an ARMA IIR filter design with a feedback filter having 12 filter taps and feedforward filter having 7 filter taps may be at most 0.3 dB in comparison with a classical FIR preceding scheme. However, such a reduction in the number of filter taps for THP feedback and feedforward filters may reduce the complexity for implementation of a Tomlinson-Harashima precoder complexity in a 10G network. In addition, ARMA approximation of a feedforward filter may be insensitive to its coefficients quantization. For example, for an ARMA approximation of a feedforward filter, there may be no transmission quality loss if 10 bits are reserved to represent fractional part of IIR filter taps as compared to the non-quantized case.

Various embodiments for a Tomlinson-Harashima precoding scheme may reduce computation and memory load during transmission due to IIR filters usage. Filters constructed in such a manner may be used in 10 Gigabit Ethernet apparatus and systems. Such filters may also be implemented in other high speed communication-oriented applications.

Network 200 of FIG. 2 may include other apparatus and systems for communicating between network nodes 202 and 203. Each node may receive and transmit information. Network nodes may each include a number of systems that may effectively be coupled to a precoder as in FIG. 2 to communicate over channel 210. Systems at these nodes may provide one or more functions at a node. A nodal system may direct operations of other systems and/or apparatus at the node. Systems at each network node (202, 203) may include external connections to each other that are wired or wireless. In an embodiment, nodal systems may be realized as a switch, a router, a computer, a server, or combination of these elements. Further, nodal systems may couple to each other or other apparatus at a node over a medium that is compatible with Peripheral Component Interconnect (PCI) or with PCI express.

The network nodes (202, 203) each may represent processing systems having a physical layer (PHY) entity arranged to operate in accordance with 10GBase-T as defined by the IEEE 802.3an series of standards, for example. The 10GBase-T PHY may interface with, for example, a 10G media access control (MAC) and Gigabit Media Independent Interface (XGMII) in the IEEE architecture. The 10GBase-T PHY may include part of a network interface card (NIC), for example. Nodes (202, 203) may include any processing system and/or communications device suitable for use with a 10GBase-T device. For example, node pair (202, 203) may be implemented as a pair of switches, a pair of routers, a pair of servers, a switch and a router, a switch and a server, a server and a router, and so forth. In addition, nodes (202, 203) also may be part of a modular system in which 10GBase-T is the high-speed connection for the system. Further, examples for nodes (202, 203) may include high-end servers, supercomputers, clusters, grid computing, workgroup switch uplinks, aggregation uplinks, storage systems, and so forth. The embodiments are not limited in this context.

Various embodiments or combination of embodiments for apparatus and methods for constructing a feedback filter in a Tomlinson-Harashima preceding scheme to match a feedforward filter, where the feedforward filter is approximated using autoregressive moving average modeling, may be realized in hardware implementations, software implementations, and combinations of hardware and software implementations. A Steiglitz-McBride algorithm may be applied to an autoregressive moving average modeling for the feedforward and feedback filters. Various implementations may include a machine-readable medium having computer-executable instructions for performing various embodiments similar to embodiments discussed herein. The instructions may include instructions to approximate a feedforward filter using ARMA modeling. The instructions may include instructions to acquire an ARMA approximation of a feedforward filter and to construct a feedback filter to match the approximated feedforward filter. The machine-readable medium is not limited to any one type of medium. The machine-readable medium used will depend on the application using an embodiment.

Figure 6:
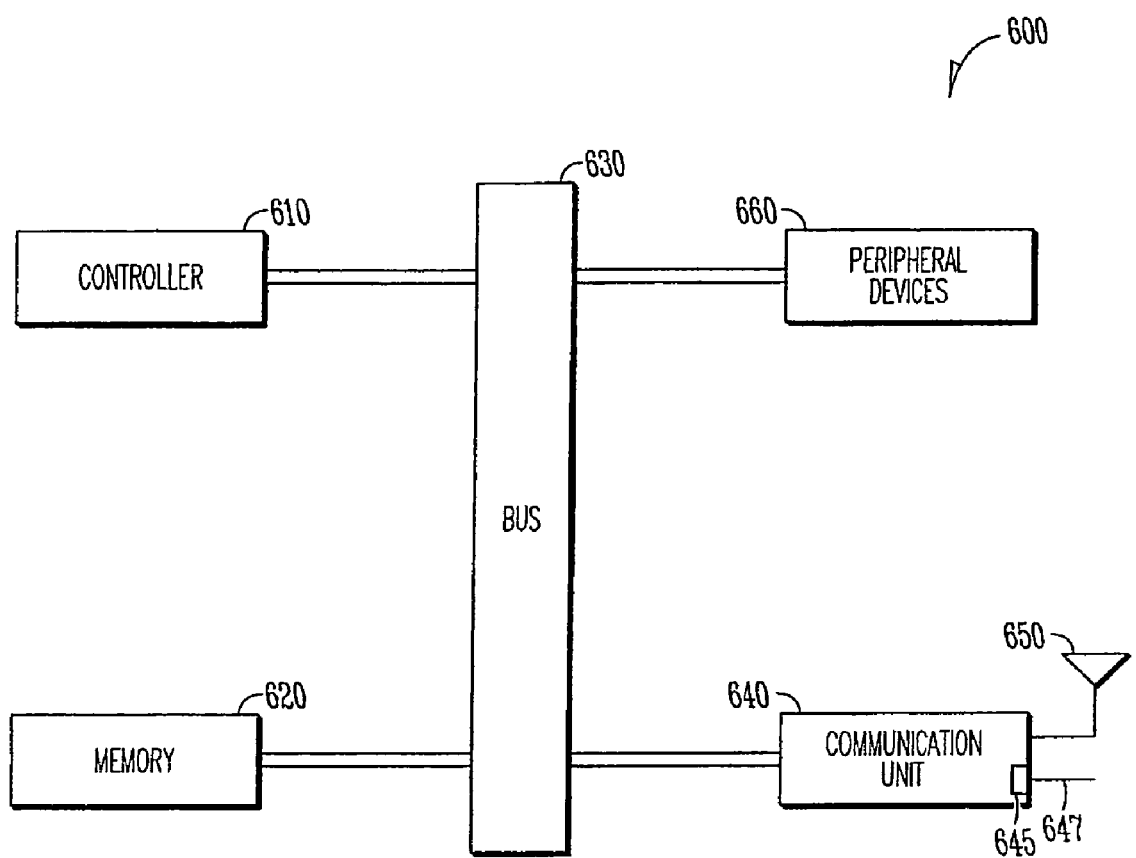
FIG. 6 illustrates a block diagram of an embodiment of a system having an embodiment of a Tomlinson-Harashima precoder scheme based on autoregressive moving average modeling.

FIG. 6 illustrates a block diagram of an embodiment of a system 600 having an embodiment of a Tomlinson-Harashima precoder scheme based on an autoregressive moving average modeling. System 600 may include a controller 610, a memory 620, and a bus 630, where bus 630 provides electrical connectivity between controller 610 and memory 620 and between controller 610 and a communication unit 640. Bus 630 may be a parallel bus. Bus 630 may be a serial bus.

Communication unit 640 may include an embodiment of a feedback filter in a Tomlinson-Harashima precoding scheme to match a feedforward filter, where the feedforward filter and the feedback filter may be approximated using autoregressive moving average modeling similar to the schemes discussed with respect to FIGS. 1 and 2. Communication unit 640 may couple to a wired network or a wireless network. Alternatively, communication unit 640 may include a network interface to couple to a wired network and to a wireless network. A wired network may include a network having wire channels, fiber optic channels, and/or co-axial channels.

An embodiment may include an additional peripheral device or devices 660 coupled to bus 630. Bus 630 may be compatible with PCI or with PCI express. In an embodiment, communication unit 640 may include a network interface card. In an embodiment, communication unit 640 may include a communications device suitable for use with a 10Base-T device. Communication unit 640 may include a connection 645 to a wired network. Connection 645 may be configured to connect to a cable 647. Connection 645 may be configured to connect to an unshielded twisted pair cable. Connection 645 may be configured to connect to a shielded twisted pair cable. In a wireless embodiment, communication unit 640 may be coupled to an antenna 650. In an embodiment, antenna 650 may be a substantially omnidirectional antenna. System 600 may include, but is not limited to, information handling devices, wireless systems, telecommunication systems, fiber optic systems, electro-optic systems, and computers.

In an embodiment, controller 610 is a processor. Memory 620 may include any form of machine-readable medium that has machine executable instructions to acquire an approximation of a feedforward filter in a Tomlinson-Harashima precoder scheme, where the feedforward filter is approximated using autoregressive moving average modeling, and to construct a feedback filter to match the approximated feedforward filter. In an embodiment, the feedback filter may be approximated using autoregressive moving average modeling. The machine may include a computer. Peripheral devices 660 may also include displays, additional storage memory, or other control devices that may operate in conjunction with controller 610. Alternatively, peripheral devices 660 may include displays, additional storage memory, or other control devices that may operate in conjunction with controller 610, communication unit 640, and/or memory 620.

In a wireless arrangement in which the transmission medium between transmitter and receiver is relatively steady or slowly varying, the channel characteristics may be modeled or determined. With a given wireless channel model, an approximation of a feedforward filter in a Tomlinson-Harashima precoder scheme using an autoregressive moving average modeling may be acquired, and a feedback filter may be constructed to match the approximated feedforward filter in a manner similar to embodiments discussed herein. The feedforward filter may be constructed using an autoregressive moving average modeling and applying a Steiglitz-McBride algorithm. Various embodiments for constructing feedforward filters and their associated feedback filters may be implemented for a wireless application having a relatively steady or slowly varying transmission medium.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon reviewing the above description. The scope of the present invention includes any other applications in which embodiment of the above structures and fabrication methods are used. The scope of the embodiments of the present invention should be determined with reference to the appended claims, along with the fill scope of equivalents to which such claims are entitled.

What is claimed is:

1. A method comprising:
   acquiring an approximation of a feedforward filter in a Tomlinson-Harashima precoder scheme, the feedforward filter being approximated using autoregressive moving average modeling; and
   constructing a feedback filter to match the approximated feedforward filter, wherein constructing the feedback filter includes generating a target feedback filter from the approximation of the feedforward filter and conducting autoregressive moving average modeling of the target feedback filter to construct the feedback filter.

2. The method of claim 1, wherein acquiring the approximation of the feedforward filter includes approximating a set of feedforward filters using autoregressive moving average modeling, the set corresponding to communication channels of varying characteristics.

3. The method of claim 2, wherein the varying characteristics include different channel lengths.

4. The method of claim 1, wherein constructing the feedback filter includes constructing an infinite impulse response filter to match a feedforward infinite impulse response filter approximated using the autoregressive moving average modeling.

5. The method of claim 1, wherein constructing the feedback filter includes constructing a Tomlinson-Harashima precoder feedback filter having less than 15 filter taps.

6. The method of claim 1, wherein acquiring the approximation of the feedforward filter includes acquiring an approximation of a feedforward filter having less than 10 filter taps.

7. A non-transitory machine-readable storage medium having instructions stored thereon, which when performed by a machine, cause the machine to:
   acquire an approximation of a feedforward filter in a Tomlinson-Harashima precoder scheme, the feedforward filter approximated using autoregressive moving average modeling; and
   construct a feedback filter to match the approximated feedforward filter, wherein constructing the feedback filter includes generating a target feedback filter from the approximation of the feedforward filter and conducting autoregressive moving average modeling of the target feedback filter to construct the feedback filter.

8. The non-transitory machine-readable storage medium of claim 7, wherein to acquire the approximation of the feedforward filter includes approximating a set of feedforward filters using autoregressive moving average modeling, the set corresponding to communication channels of varying characteristics.

9. The non-transitory machine-readable storage medium of claim 7, wherein instructions that cause the machine to construct the feedforward filter include instructions that cause the machine to construct an infinite impulse response filter to match an infinite impulse response filter feedback filter.

10. The non-transitory machine-readable storage medium of claim 7, wherein instructions that cause the machine to construct the feedback filter include instructions that cause the machine to construct a Tomlinson-Harashima precoder feedback filter having less than 20 filter taps.

11. An apparatus comprising:
a feedback filter in a Tomlinson-Harashima precoder, the Tomlinson-Harashima precoder capable of coupling to a physical communication channel, the feedback filter to match a feedforward filter, the feedforward filter having filter taps, the filter taps being autoregressive moving average modeling approximated filter taps; and
a processor and a memory operatively coupled to the processor, the processor and the memory arranged to acquire an approximation of the feedforward filter approximated using autoregressive moving average modeling and to construct the feedback filter such that the construction includes generating a target feedback filter from the approximated feedforward filter and conducting autoregressive moving average modeling of the target feedback filter to construct the feedback filter.

12. The apparatus of claim 11, wherein the feedback filter includes an infinite impulse response filter to match the feedforward filter arranged as infinite impulse response filter.

13. The apparatus of claim 11, wherein the feedback filter includes a feedback filter having less than 20 filter taps.

14. The apparatus of claim 11, wherein the feedback filter includes a feedback filter to match a Tomlinson-Harashima precoder feedforward filter having less that 15 filter taps.

15. The apparatus of claim 11, wherein the feedback filter includes a feedback filter matched to a feedforward filter to provide equalization in 10 gigabit Ethernet operation.

16. A system comprising:
a controller;
a parallel bus; and
a feedback filter in a Tomlinson-Harashima precoder scheme, the feedback filter communicatively coupled to the controller through the parallel bus, the feedback filter to match a feedforward filter, the feedforward filter having filter taps, the filter taps being autoregressive moving average modeling approximated filter taps; and
a memory operatively coupled to the controller, the controller and the memory arranged to acquire an approximation of the feedforward filter approximated using autoregressive moving average modeling and to construct the feedback filter such that the construction includes generating a target feedback filter from the approximated feedforward filter and conducting autoregressive moving average modeling of the target feedback filter to construct the feedback filter.

17. The system of claim 16, wherein the feedback filter includes an infinite impulse response filter to match the feedforward filter arranged as infinite impulse response filter.

18. The system of claim 16, wherein the feedback filter includes the feedback filter being compatible with a 10 Gigabit Ethernet.

19. The system of claim 16, wherein the feedback filter includes the feedback filter having less than 20 filter taps.

20. The system of claim 16, wherein the system includes the feedforward filter in the Tomlinson-Harashima precoder scheme to provide bi-directional communication, the feedforward filter having autoregressive moving average modeling approximated filter taps.

* * * * *

UNITED STATES PATENT AND TRADEMARK OFFICE
CERTIFICATE OF CORRECTION

| | | |
|---|---|---|
| PATENT NO. | : 8,054,875 B2 | |
| APPLICATION NO. | : 12/087178 | |
| DATED | : November 8, 2011 | |
| INVENTOR(S) | : Taubin et al. | |

It is certified that error appears in the above-identified patent and that said Letters Patent is hereby corrected as shown below:

On the Title page, in Item (75), in "Inventors", in column 2, line 2, delete "Sergev" and insert -- Sergey --, therefor.

Signed and Sealed this
Seventeenth Day of January, 2012

David J. Kappos
*Director of the United States Patent and Trademark Office*